(12) United States Patent
Filipiak

(10) Patent No.: US 11,568,436 B2
(45) Date of Patent: Jan. 31, 2023

(54) CREATING AN AWARDS PROFILE

(71) Applicant: SoInteractive, SA, Cracow (PL)

(72) Inventor: Janusz Jeremiasz Filipiak, Brooklyn, NY (US)

(73) Assignee: SoInteractive, SA, Cracow (PL)

( * ) Notice: Subject to any disclaimer, the term of this patent is extended or adjusted under 35 U.S.C. 154(b) by 752 days.

(21) Appl. No.: 14/147,399

(22) Filed: Jan. 3, 2014

(65) Prior Publication Data
US 2015/0193805 A1 Jul. 9, 2015

(51) Int. Cl.
G06Q 30/02 (2012.01)

(52) U.S. Cl.
CPC ............... *G06Q 30/0226* (2013.01)

(58) Field of Classification Search
CPC ............ G06F 3/04817; G06F 17/30126
USPC ............................................. 715/202
See application file for complete search history.

(56) References Cited

U.S. PATENT DOCUMENTS

| 8,444,491 | B2 | 1/2013 | Bethke | |
| 8,577,707 | B2* | 11/2013 | Nielsen | G01C 15/02 |
| | | | | 705/7.11 |
| 2007/0218987 | A1* | 9/2007 | Van Luchene | A63F 13/10 |
| | | | | 463/30 |
| 2009/0198741 | A1* | 8/2009 | Cooper | A63F 13/79 |
| 2010/0056273 | A1* | 3/2010 | Reville | A63F 13/00 |
| | | | | 463/31 |
| 2011/0107246 | A1* | 5/2011 | Vik | G06F 9/4443 |
| | | | | 715/771 |
| 2011/0153374 | A1* | 6/2011 | Veith | G06Q 10/02 |
| | | | | 705/5 |
| 2011/0288912 | A1* | 11/2011 | McCrea | G06Q 30/02 |
| | | | | 705/14.2 |
| 2012/0172131 | A1* | 7/2012 | Boswell | A63F 13/12 |
| | | | | 463/42 |
| 2012/0232971 | A1 | 9/2012 | Pabst | |
| 2012/0270661 | A1 | 10/2012 | Smith | |
| 2013/0086484 | A1 | 4/2013 | Antin | |
| 2013/0096981 | A1 | 4/2013 | Evans | |

OTHER PUBLICATIONS

Tony Hirst, "More Olympics Medal Table Visualizations," Aug. 24, 2008, http://blog.ouseful.info, pp. 1-6.*

(Continued)

*Primary Examiner* — Andrew R Dyer
(74) *Attorney, Agent, or Firm* — McAndrews, Held & Malloy, Ltd.

(57) ABSTRACT

A reward program is a type of "loyalty marketing" that typically utilizes a formal scheme to promote or encourage specific actions or behavior by a target audience. For instance, credit card companies have been known to offer "cash back" rewards to cardholders for using a particular credit card over some other form of payment. As another example, airlines are known to offer "frequent flier" mile rewards for electing to fly on a particular airline. The frequent flier miles can be traded in for travel discounts. Loyalty marketing concepts can also be applied to website applications. For instance, a website reward program can allow visitors an opportunity to earn virtual awards, e.g.: badges, titles, points, etc. Visitors can also earn awards that translate into real-world benefits, such as discounts, vouchers, etc.

5 Claims, 6 Drawing Sheets

(56) References Cited

OTHER PUBLICATIONS

Merriam-Webster, An Encyclopedia Britannica Company, Jan. 21, 2012.*
"Marketing;" Nov. 21, 2013; Merriam-Webster.com; 3 Pages.*
"Instance;" Mar. 6, 1998; Free On-Line Dictionary of Computing; 2 Pages.*
Foursquare Website, http://aboutfoursquare.com/foursquare-awards-badges; last visited Jan. 29, 2014.
BigDoor Platform, http:www.bigdoor.com/platform, last visited Jul. 30, 2013; pp. 1, 3-5.
BunchBall Announces Analytics, http://www.newswire.com/news-releases/bunchball-announces; last visited Aug. 1, 2013, pp. 1-2.
Volkswagen SmileDrive, http://smiledrive.vw.com/trip#ahVzfnNtaWxlYWdlLXByb2R1Y3Rpb25yEQsSBFRyaXAYglCAgMDppAgM; first downloaded Jul. 20, 2013; last visited Jan. 29, 2014; http://laurenperlow.com/Volkswagen-SmileDrive; first downloaded Jul. 20, 2013, last visited Jan. 29, 2014; second and fifth pages.

* cited by examiner

CREATING AN AWARDS PROFILE

BACKGROUND OF THE INVENTION

1. Field of the Invention

The present disclosure relates to a method of creating awards profiles for website visitors. The awards issued to website visitors in the form of awards profiles are typically badges earned when the website visitors perform or participate in various incentive-programs offered by the websites.

2. Description of the Related Art

A reward program is a type of "loyalty marketing" that typically utilizes a formal scheme to promote or encourage specific actions or behavior by a target audience. For instance, credit card companies have been known to offer "cash back" rewards to cardholders for using a particular credit card over some other form of payment. As another example, airlines are known to offer "frequent flier" mile rewards for electing to fly on a particular airline. The frequent flier miles can be traded in for travel discounts.

Loyalty marketing concepts can also be applied to website applications. For instance, a website reward program can allow visitors an opportunity to earn virtual awards, e.g.: badges, titles, points, etc. Visitors can also earn awards that translate into real-world benefits, such as discounts, vouchers, etc.

SUMMARY

According to aspects of the present disclosure, a method of creating an awards profile comprises creating an empty image, receiving data from a user, and creating a user profile from the received data. The method also comprises creating a user avatar, and assigning the user avatar to the empty image. The method still further comprises executing a first subset of logical encodings associated with a trophy case, and executing a second subset of logical encodings associated with a geographical map. The method yet further comprises executing a first subset of graphical encodings corresponding to the first subset of logical encodings, and executing a second subset of graphical encodings corresponding to the second subset of logical encodings. The method also comprises overlaying the first subset of graphical encodings and the second subset of graphical encodings onto the empty image to create the awards profile, and transmitting the awards profile.

According to various aspects of the present disclosure, a method of assigning a badge to an image comprises receiving input, accessing data associated with the badge, predefining unique features associated with the badge and assigning the features to the badge. The method also comprises determining whether the received input is associated with the badge and then further determining in response to determining that the received input is associated with the badge, whether the badge is unlocked. The method further comprises determining in response to determining whether the badge is unlocked, whether the badge is a progress badge. The method also comprises determining, in response to determining that the badge is a progress badge, whether the progress badge has been completed. Unlocked badges and progress badges that have been completed are time-stamped and activated.

DETAILED DESCRIPTION OF THE INVENTION

Figure 1:
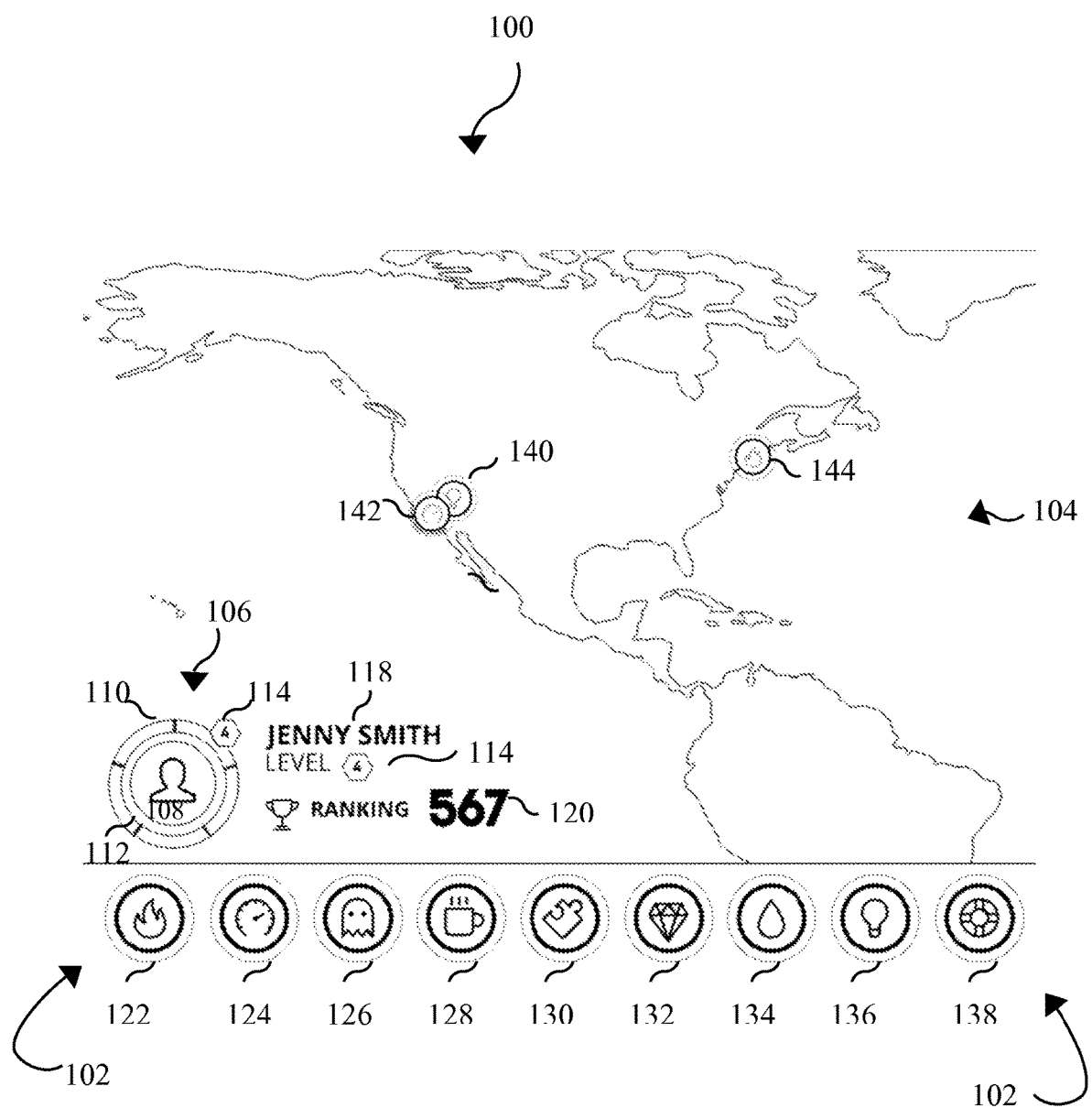
FIG. 1 shows an embodiment of an awards profile.

Reference is now made in detail to the description of the embodiments as illustrated in the figures. While several embodiments are described in connection with these figures, there is no intent to limit the disclosure to the embodiment or embodiments disclosed herein. On the contrary, the intent is to cover all alternatives, modifications, and equivalents.

Currently, numerous awards profiles exist. However, these awards profiles suffer from various drawbacks. The disclosed methods provide alternative approaches that remedy the various drawbacks existent in those previously proposed methods.

As defined herein, the term "badge" is a computer graphics icon. The badge is visible when a graphical encoding assigned to it is set to an "on state." In an illustrative example, there are four types of badges: locked, unlocked, progress and earned. However, in other implementations, other combinations of badge types may be utilized, depending upon the particular implementation. While the term "badge" is defined as a computer graphics icon for purposes of describing various embodiments presented herein, the term "badge" may be extended to mean any award or achievement that could be issued.

As defined herein the term "computer graphics image" is an icon encoded to serve as a visual identifier of a set of conditions required for an on state of logical encodings.

As defined herein, the term "earned badge" refers to a badge where all actions required to receive the badge have been completed.

As used herein, the term "empty image" refers to an image when logical encodings assigned to the image are set to an off state and the graphical encodings corresponding to the logical encodings are either not visible or do not show the icon associated with the award.

As referred to herein, the term "graphical encoding" or "graphical encodings" means a computer graphics icon. Graphical encodings are encoded icons including PNG, JPG, GIF, BMP or other known image file formats. The icons visually and uniquely identify a set of conditions required for the on state of the logical encodings.

As defined herein, the term "image" is an encoding that visually and uniquely identifies the set of conditions required for the on state of the logical encodings. Encoded images include PNG, JPG, GIF, BMP, or other known image files.

As used herein, the term "locked badge" refers to a badge where the user has no access to an achievement. Actions qualifying for the achievement will not count towards its completion. It should be appreciated that a "locked badge" is an optional mechanism that is customer-specific.

As defined herein, the term "logical encodings" refers to a representation of an on/off state defined for a particular set of user actions. Logical encodings store a reference from which further machine-readable information about the encoding can be queried. Logical encodings are identifiers of badges, of the on/off states of the badges, and also contain the time stamp that indicates when the transition from off to on occurred.

As used herein, the term "progress badge" refers to a badge where multiple actions of a same type are typically necessary. Progress towards completion of the multiple actions is stored and shown. An example of a progress badge is a badge awarded after five log-ins to the website, but the progress badge itself shows the actual number of log-ins (e.g.: the number three for three log-ins) at each stage of completion. Because the progress badge is shown each time progress towards its completion is achieved, the progress badge is actually also an earned badge.

As used herein, the term "progress bar ring" refers to a concentric ring located around a perimeter of a circular progress badge. The purpose of the progress bar ring is to indicate the number of achievements performed towards completion of the badge. An example of the progress ring is the numeric "2/6." In this example, the user would have completed two of six qualifying activities towards receiving the badge.

As defined herein, the term "unlocked badge" refers to a badge where actions qualifying for the achievement will count towards completion. The unlocked badge may be visible but not earned, or may not be visible until earned.

As used herein, the term "visual identifier" refers to a set of visual characteristics that provides the ability to clearly distinguish between two user award profiles."

According to aspects of the present disclosure, a method for creating an awards profile represents a collection of encoded user actions that have on states and off states. The on and off states for each encoded user action are unique and require satisfying a specified set of conditions that must be met by a user to achieve an on-state status. When the user meets the specified set of conditions, an icon appears on a logically-encoded site of the awards profile corresponding to the specified set of conditions that have been satisfied. All of the user's icons may appear on the user's awards' profile.

Currently, website award systems merely make it possible to take screen shots of graphical images corresponding to earned user awards. The resulting visual images in current systems do not show the aggregate of multiple achievements across a number of matrices. Therefore, the user is currently unable to observe each and every earned achievement in a single algorithmically computed presentation. Thus, an unaddressed need exists in the industry to address these deficiencies and inadequacies.

An Exemplary Awards Profile

FIG. 1 shows an exemplary embodiment of an awards profile. Consistent with the features of awards profiles in the current disclosure, a user has the ability to view all earned achievements with one click onto the user's custom-designed webpage. Now referring to FIG. 1, a rectangular FIG. 100 contains a trophy case 102 and a map 104.

A circular icon located in the preferred embodiment in the lower left area of the map 104, is used to create an avatar 106 showing an outline of a user's face 108. A photograph of a user, or images including pictorial scenes or cartoon characters may be inserted into the circular icon 106. An outer ring of the avatar 106 is a progress ring 110. The progress ring 110 is divided into five equal segments 112. Each segment 112 holds a badge icon.

FIG. 1 100 shows a progress ring 114 in one of five segments 112 of a progress ring 110 icon. This particular progress badge 114 icon contains a number four (4). The number four (4) corresponds to a user who has attained Level 4. Levels are pre-defined for a user. Level 1 status corresponds to zero to four earned badges. Level 2 corresponds to five to nine earned badges, Level 3 corresponds to ten to fourteen earned badges, and Level 4 corresponds to fifteen to nineteen earned badges. Once five earned badges occupy the progress ring 110 icon, the progress ring 110 clears of all badges, a new level attained appears in one of the five segments as a level-earned badge, and the process continues.

A user's first name and last initial 118 appear on the lower left portion of the rectangular FIG. 100. Alpha numeric ranking information 120 also appears on the lower left portion of the rectangular FIG. 100. In FIG. 1, the number "567" means that a user, "Jenny Smith," ranks 567$^{th}$ out of the total number of users in terms of badges awarded.

Badges appearing in the rectangular FIG. 100 change instantly when user input is received. Currently, ranking information is updated daily, but in another embodiment, ranking information could be updated more frequently.

In FIG. 1, the trophy case 102 shows nine most recently earned badges occupying badge locations 122 through 138. The most recently earned badge, an alpha numeric 10× icon, is in a first badge location 122, in the far left location in the trophy case 102. The flame in the icon in badge position 122 means that a user has visited a participating grill restaurant in New York City.

The icon showing a gauge in a second badge location 124 signifies the user has participated at an event hosted at a motor speedway located in close proximity to Los Angeles, Calif. A badge showing a ghost occupying a third badge location 126 means that the user attended a sponsored Halloween event, and an icon showing a cup containing a hot beverage in the fourth badge position 128 indicates that the user purchased goods at a participating coffee shop. A puzzle piece shown in the icon in the fifth badge position 130 signifies the user purchased items from a participating children's toy store. An icon containing a diamond appears in the sixth badge position 132 indicating that the user purchased merchandise from a participating jewelry store. A rain-drop depicting that the user participates in a recognized water-conservation program is shown in the seventh badge position 134. A light bulb appearing in the icon in the eighth badge position 136 signifies that the user has purchased a Las Vegas educational tour, and an icon with a cross inlaid with a concentric circle as shown in the ninth badge position 138 indicates that the customer has purchased a boat trip from a recognized vendor.

Destination badges are shown both in the trophy case 102 and on the map 104. Three destination badges appear on the rectangular image 100 in FIG. 1. A badge 144 showing a flame appears on the map 104 at a location geographically approximating New York City, and is also shown in the trophy case in the first badge position 122. The gauge badge icon 142 and the light bulb badge icon 140 seen in badge positions two 124 and eight 136 respectively are observed on the map 102 at locations geographically approximating Los Angeles, Calif.

Process for Creating the Image

Figure 2:
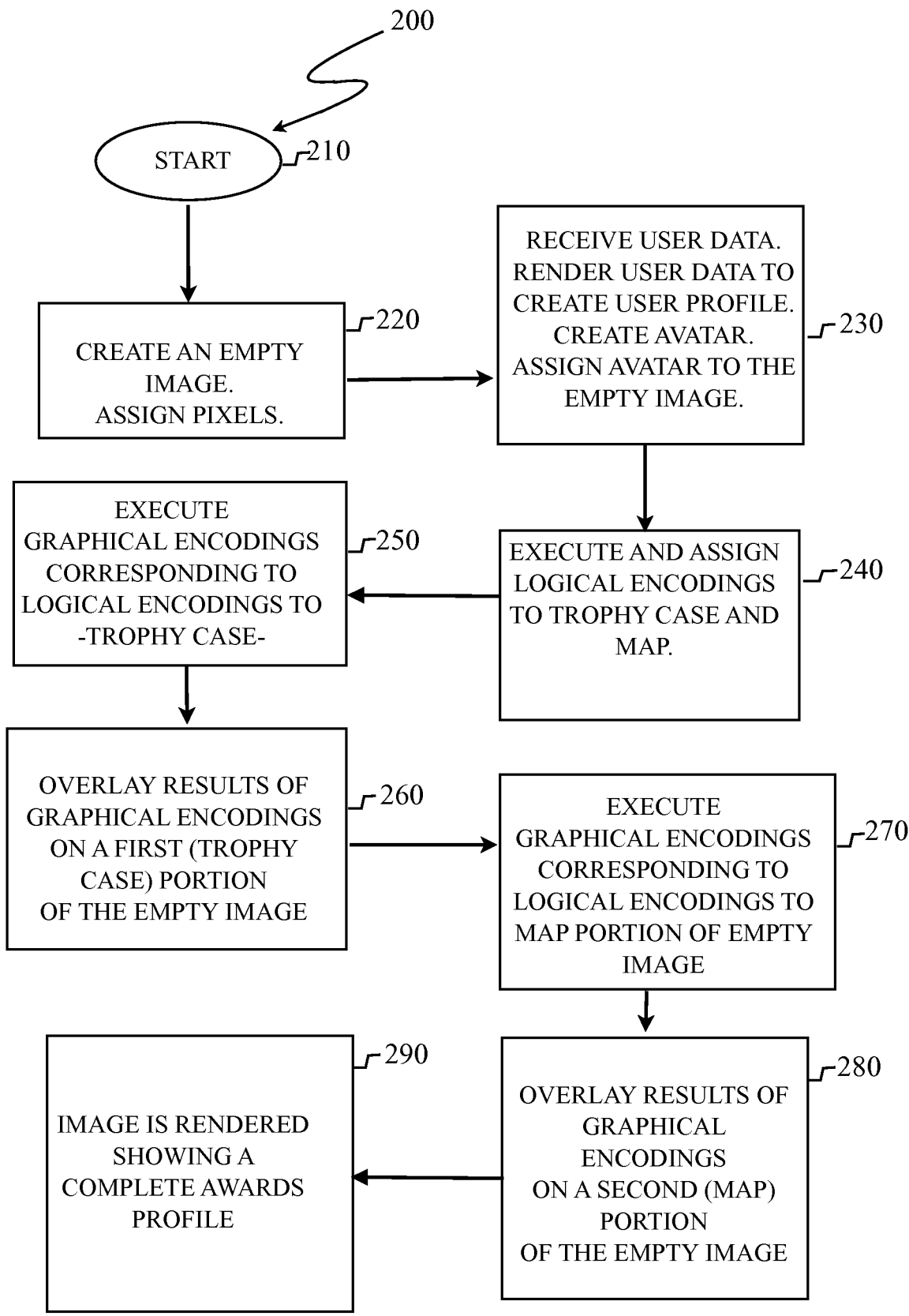
FIG. 2 is a flow chart illustrating a method for creating an awards profile according to various aspects of the present disclosure.

Referring now to FIG. 2 200, one embodiment of a method of creating an awards profile begins 210 by creating 220 an empty image. Pixels are then assigned 220 to the empty image. The resultant empty image, as seen in the embodiment shown in FIG. 1, is a rectangular figure with fixed dimensions. A variety of backgrounds may be used to overlay the empty image. An approximation of a map, an impression of an artist's own choosing, a photograph or a computer graphics file may be overlaid onto the empty image.

Referring to one embodiment as described above in FIG. 1 100, an empty image is a rectangular FIG. 100 overlaid with a trophy case 102 and a map 104. As an example, another embodiment could show the empty image overlaid with a screen shot of a beach at sunset.

Regardless of the number of icons that may ultimately appear on the once-empty image, as described in greater detail below, the size of the image is not impacted.

Creating the Awards Profile

Continuing with FIG. 2 200 in a preferred embodiment, after creating 220 an empty image and assigning 220 a pre-defined number of pixels to it, the process then receives 230 user data. The process then renders the received 230 user data to create a user profile. The avatar 106, as previously shown in FIG. 1 100, is also created for the user. Additional user data may be assigned to create alpha numeric and icon-identifiers.

In one preferred embodiment, and again referring to FIG. 2, a process 240 for logically encoding badges is executed using the user data. One embodiment of the logical encoding process 240 is shown in greater detail with reference to the process in FIG. 3, below. Next, a process 250 for graphically encoding a trophy case 102 is executed. One embodiment of the process 250 for graphically encoding the trophy case is shown in greater detail in the process in FIG. 4, below. Badges associated with the graphical encodings are overlaid 260 on a trophy case portion of the image. Thereafter, a process 270 for graphically encoding a map is executed. One embodiment of the graphical encoding 270 of the map is shown in greater detail with reference to the process in FIG. 5, below. Badges that are associated with the graphical encodings for the map are overlaid 280 on a map 104 portion of the image. The process then renders an image and shows 290 an awards profile. Thus, upon completion of the process of FIG. 2, a previously empty image is now transformed with badges in an "on" state. In other words, the logical encodings corresponding to the graphical encodings direct the icons corresponding to the graphical encodings to switch from an off state to an on state when the conditions for completing a given badge are met.

In the preferred embodiment, the awards profile is presented to each user as a graphical layout of all the information stored as logical encodings. The graphical layout is the rectangular figure with the trophy case 102 and the map 104. The logical encodings are represented either through human-readable text (alpha-numeric) of the computed information or through graphics (icons, avatars, or other images). Another feature of the awards profile is a list, at a location not within the image, of all of the badges earned. The earned badges may be presented as achievements listed in reverse chronological order or by category.

Logical Encodings

Logical encodings represent stored information including user identifier data, on/off state-information regarding graphical encodings, timestamps, progress count-information, geographical locations, and other alpha numeric text. Information for each logical encoding is stored for both an on state and an off state because it is possible to view pending and un-earned achievements in some embodiments. In other words, the logical encodings represent raw data from which the graphical encodings are derived.

Figure 3:
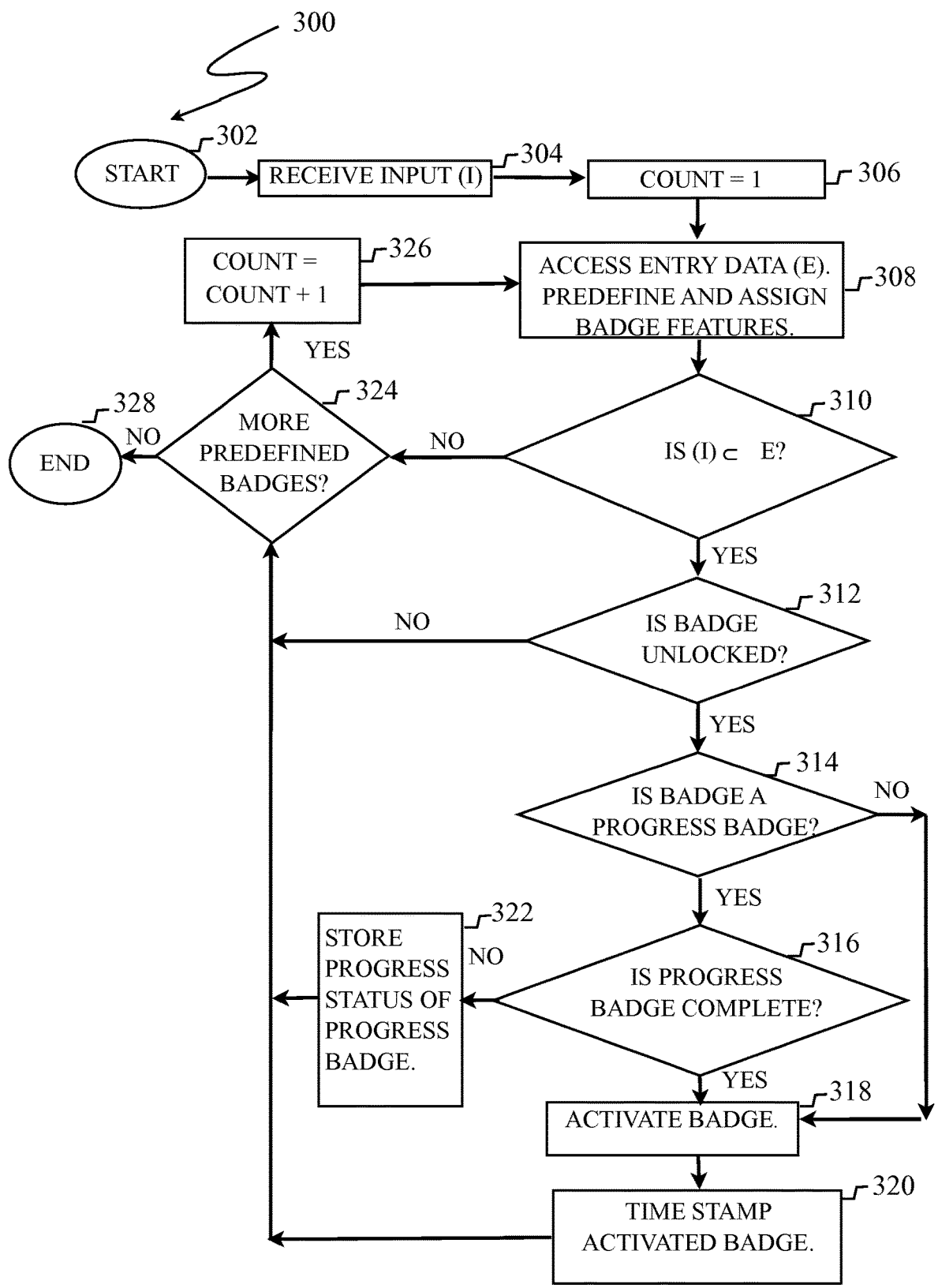
FIG. 3 is a flow chart illustrating a method for assigning logical encodings to user badges according to various aspects of the present disclosure.

The process in FIG. 3 shows one embodiment of the method of assigning logical encodings that are related to the empty image. Before addressing the details of FIG. 3, it should be noted that, for one preferred embodiment, each badge is associated with a predefined set of conditions. Thus, upon a particular action by a user, the process algorithmically computes the logical encoding. The algorithmic computation is a procedural function on the inputs (user, logical encoding, user activity) and the output of a logical encoding state (on/off). Preferably, the function satisfies the following properties: (1) for any defined user, finite activity and defined logical encoding, the function computes the logically encoded state in a finite amount of time, with the computational complexity being proportional to the size of the data); (2) the function produces a logical encoding state (on/off) for any logical encoding, any user activity and any user (provided that the user activity provided as input is assigned to the user); and (3) for any two different users with an equivalent history or identical history of activities, the function produces the same logical encoding states for the same logical encodings. In other words, the on/off states are specified according to a well-defined set of conditions.

With this broad embodiment in mind, as shown in FIG. 3, one specific embodiment of the process begins 302 by receiving 304 user input and sets 306 a counter to 1. The process then accesses 308 an entry in a database that corresponds to the count number. Each entry in the database is associated with a predefined badge. For example, entry 1 is associated with a first predefined badge, entry 2 is associated with a second predefined badge, entry 3 is associated with a third predefined badge, etc. In this particular example, since the counter is 1, the process accesses 308 the first predefined badge, then the process next determines 310 whether the first predefined badge is associated with the user input 304. If the first predefined badge is not associated with the user input 304, then the process determines 324 whether there are additional predefined badges in the database. If there are additional predefined badges in the database, then the process increases 326 the count by 1, and accesses 308 the second predefined badge. This process continues recursively until all of the entries have been accessed 308 without finding any predefined badge associated with the user input 304, or until the process determines 310 that there exists a predefined badge that is associated with the user input 304.

If the process determines 310 that the user input 304 is associated with a predefined badge in the database, then the process next determines 312 whether that predefined badge is unlocked. If the process determines 312 that the predefined badge is not unlocked, then the process determines 324 whether there are additional predefined badges in the database, and the process repeats as discussed above. If, however, the process determines 312 that the predefined badge is unlocked, then the process next determines 314 whether the predefined badge is a progress badge. By this point in the process, the recursive steps, above, have converged to a determination that the user input is associated with an unlocked, predefined badge, which exists in the data base.

Thus, if the process determines 314 that the predefined badge is not a progress badge, then the process activates 318 the predefined badge and time-stamps 320 the activated predefined badge. The process then determines 324 whether there are additional predefined badges in the database, and the process repeats as discussed above.

If, however, the process determines 314 that the predefined badge is a progress badge, then the process next determines 316 whether the progress badge is complete. In other words, the process determines whether all of the actions needed to activate the progress badge have been completed. If the process determines 316 that the progress badge is complete, then the process activates 318 and time-stamps 320 the progress badge, and the process repeats with determining 324 whether there are additional predefined badges. If the process determines 316 that the progress badge is not complete, then the process stores 322 a progress status of the progress badge, and the process repeats with determining 324 whether there are additional predefined badges. As one can see from FIG. 3, upon completing this process, on/off states of the predefined badges are updated each time that the process 300 receives user input. If there are no additional badges, the process ends 328 until more input 304 is subsequently received.

Graphical Encodings

A graphical encoding is an icon such as a PNG, JPG, GIF, or BMP icon that visually and uniquely identifies a set of conditions required for an on state of a corresponding logical encoding. In one preferred embodiment some logical encodings are assigned a minimum of a pair of corresponding graphical encodings, namely, one graphical encoding for the trophy case 102 and another graphical encoding for the map 104, such as that shown in FIG. 1. In a different embodiment, any rectangular figure with fixed boundaries and a fixed number of pixels could support the visual identification of the set of conditions required for the on state of the logical encodings. For example, the rectangular figure could be overlaid with an airport terminal image. The graphical encodings could then show a person walking in the terminal with a suitcase (off state) or a suitcase with a decal with the name of a city the person has visited (on state).

Graphical Encodings—Trophy Case

Figure 4:
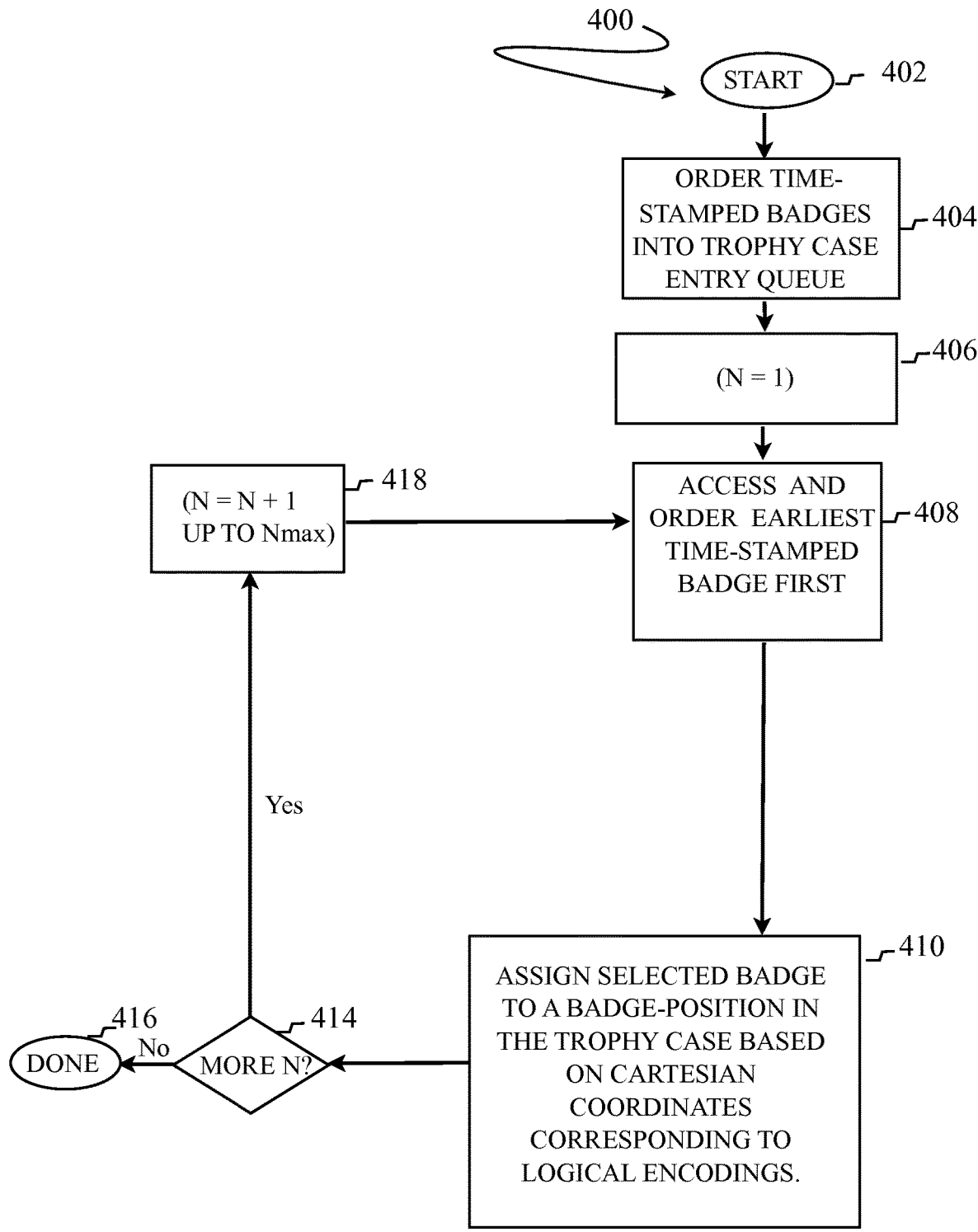
FIG. 4 is a flow chart illustrating a method for assigning graphical encodings to user badges in a trophy case according to various aspects of the present disclosure.

The process in FIG. 4 shows one embodiment of the method of assigning graphical encodings to a trophy case 102. The process in FIG. 4 occurs after the logical encoding process of FIG. 3. Consequently, when the process of FIG. 4 400 begins 402, one or more predefined badges are already time-stamped and set to an on state. Thus, as shown in FIG. 4, the process orders 404 those time-stamped badges, preferably in chronological order. Thus, by this point, the earliest time-stamped badge is first, while the latest time-stamped badge is last in the chronological order. Stated differently, the badge with the earliest time stamp is associated with the first badge that is selected (badge count number N=1), the badge with the second earliest time stamp is associated with the second badge that is selected (badge count number N=2), the badge with the third earliest time stamp is associated with the third badge that is selected (badge count number N=3), etc. Once ordered 404, the process sets 406 a counter to 1 and selects 408 the first badge, which is the most-recently time-stamped badge. The first badge is assigned 410 to a badge location within the trophy case 102. The process next determines 414 whether all of the time-stamped badges have been assigned 410 to a badge location in the trophy case 102. If more time-stamped badges exist, then the process 400 increments 418 the counter, selects 408 the next time-stamped badge, and assigns 410 that time-stamped badge to its corresponding location in the trophy case 102. This process repeats recursively until all of the time-stamped badges have been assigned to their respective locations in the trophy case 102. If there are no additional time-stamped badges, the process ends 416 until more time-stamped badges are ordered 404 into the trophy case entry queue.

In one preferred embodiment, if the total number of badges exceeds a predetermined number of badge-locations, then the earliest-assigned badge is removed from the trophy case 102, thereby displaying only a predefined number of recent badges. For example, if the trophy case 102 has a capacity to display nine total badges and the user has accumulated twenty (20) time-stamped badges, then the trophy case will display only the most-recent nine (9) badges.

In one embodiment, and referring to FIG. 1, a first badge location 122 in the trophy case 102 is seen in the far left-hand corner-location in the trophy case 102. The first badge location 122 in the far left-hand corner-location in the trophy case 102 is currently occupied by the badge embedded with a flame. In the embodiment shown in FIG. 1 100, a maximum of nine (9) predetermined badges can be assigned to the trophy case 102 at any time. The ninth badge location 138 is seen in the far right hand location in the trophy case 102. The ninth badge location 138 actually shows the earliest time-stamped badge of the nine (9) badges shown. In the current example, when a tenth badge is time-stamped, the tenth badge (which is the most-recently earned badge) will be assigned to the first-badge location 122, all of the other badges will move one location to the right, and the current ninth badge 138 will be removed to make room for the most-recent time-stamped tenth badge.

Graphical Encodings—Map

Figure 5:
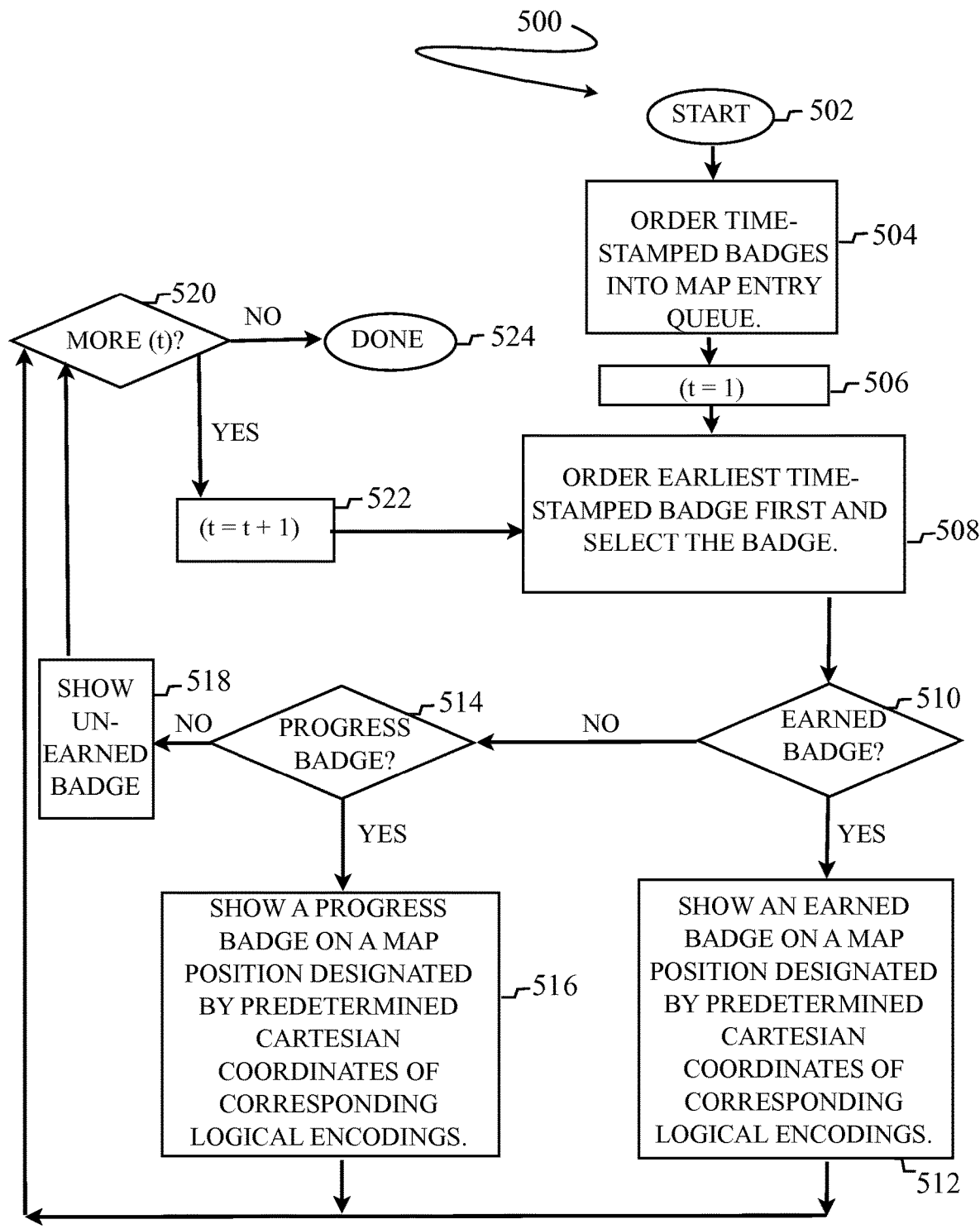
FIG. 5 is a flow chart illustrating a method for assigning graphical encodings to user badges onto a map according to various aspects of the present disclosure.

The process in FIG. 5 shows one embodiment of the method of assigning graphical encodings to a map 104. As one can appreciate, the process of FIG. 5 can occur concurrently with, before, or after the process of FIG. 4. As shown in FIG. 5, the process begins 502 by ordering 504 time-stamped badges into a map entry queue and setting 506 the counter to 1. At t=1 the process accesses 508 a first time-stamped badge. The process then determines 510 whether the first time-stamped badge is an earned badge. If the process determines 510 that the first time-stamped badge is an earned badge, then the earned badge is shown 512 on the map 104 at a location designated by predetermined Cartesian coordinates for the earned badge. The system then determines 520 whether additional time-stamped badges exist. If the system determines that there is an additional time-stamped badge 520, then the system increments 522 the counter and accesses 508 the additional time-stamped badge corresponding to the new count. The process continues recursively until the process 500 determines that there are no more earned badges.

If more than one earned badge is assigned to the same Cartesian coordinates, the badges are stacked on the Cartesian coordinates assigned to the map in reverse chronological order. If the process determines 510 that the time-stamped badge is not an earned badge, then the process determines 514 whether the time-stamped badge is a progress badge. If the process determines 514 that the time-stamped badge is a progress badge, the progress badge is shown 516 on the map 104 at a location designated by predetermined Cartesian coordinates corresponding to the progress badge. If the process determines 514 that the progress badge is not complete, then the process shows 518 an unearned badge with a progress status, and the process repeats with determining 520 whether there are additional time-stamped badges. The process of determining whether there are earned badges and progress badges continues recursively until there are no available time-stamped badges in the map entry queue. If there are no available time-stamped badges in the map entry queue, the process is done 524 until more time-stamped badges are ordered 504 into the map entry queue.

The process in FIG. 4 and FIG. 5 above are not limited to an empty image defined by a rectangle. In an alternate embodiment showing the empty image as an oval or a circle, pre-determined polar coordinates could be assigned to the empty image rather than the Cartesian coordinates described above.

Computer Program Product

Figure 6:
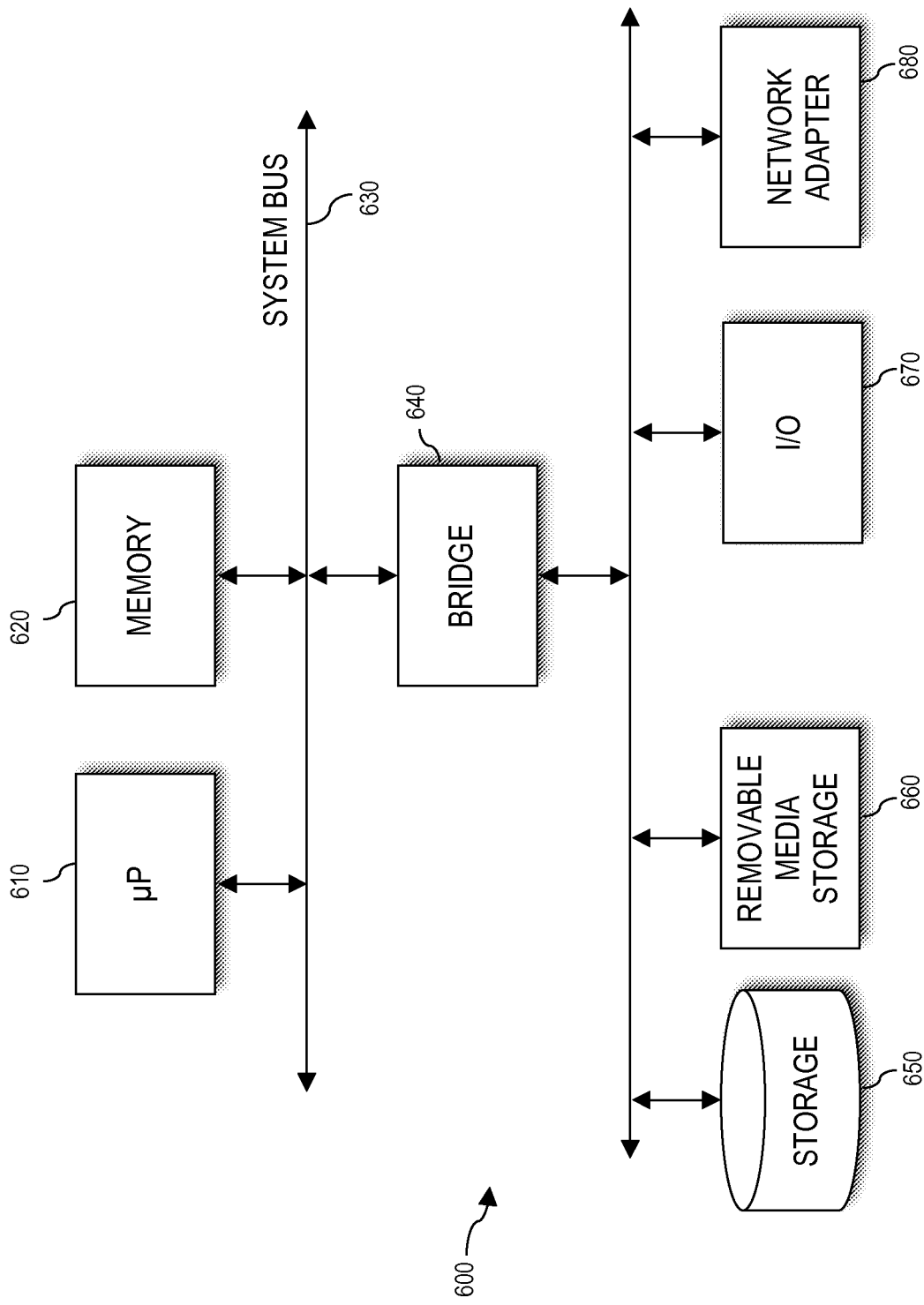
FIG. 6 is a block diagram of a computer system having a computer readable storage medium for implementing functions according to various aspects of the present invention as described in greater detail herein.

Referring to FIG. 6, a block diagram of a data processing system is depicted in accordance with the present invention. Data processing system 600 includes one or more processors 610 connected to memory 620 across a system bus 630. A bus bridge 640 is connected to the system bus 630 and provides an interface to any number of peripherals, such as storage 650 (e.g., hard drives), removable media storage 660 (e.g., tape drives, CD-ROM drives, FLASH drives, etc.), I/O 670 (e.g., keyboard, mouse, monitor, etc.), a network adapter 680 or combinations thereof.

The memory 620, storage 650, removable media storage 660 or combinations thereof can be used to implement a computer usable storage medium having computer usable program code embodied thereon. The computer usable program code may be executed to implement any aspect of the present invention, for example, to implement any aspect of any of the methods and/or system components illustrated in the preceding drawings.

As will be appreciated by one skilled in the art, aspects of the present invention may be embodied as a system, method or computer program product. Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium includes, for example, but not limited to, a hard disk, solid state drive, a random access memory (RAM), a read-only memory (ROM), an erasable programmable read-only memory (EPROM), Flash memory, an optical storage device (e.g., CD-ROM), a magnetic storage device, or any suitable combination of the foregoing or other storage hardware. Thus, a computer readable storage medium includes any tangible medium that can contain, or store a program for use by or in connection with an instruction execution system, apparatus, or device.

A computer readable signal medium is a propagated data signal with computer readable program code embodied therein, for example, in baseband or as part of a carrier wave. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

As described herein, awards profiles are a design-once, extend later, method to creating user profiles. This method is not available in current systems. The size of the image does not depend on the total number of graphical encodings available for all logical encodings. This means, when adding graphical encodings for logical encodings, there is no need to change the size of the image.

In current image profiles, the user profile typically contains a user identifier that could be the user's first and last name and then a listing of all of the achievements. The listing is either an alpha numeric expression or it may be a series of icons. The listing is typically in rows and columns. For example, in a profile designed with five graphical encodings in the on state in each row, a screen shot of the user profile with three graphical encodings would show three icons in one row and the size would be as tall as the amount of user information presented. If in the same system, the user profile had twelve graphical encodings in the on state, the twelve encodings would occupy three rows. The size of the image would not then be constant because the image would need to become taller to show all three rows.

Uses and Benefits of the Invention

User satisfaction from and interest in the products and services increase when the user has the ability to view all of the earned achievements with one click onto the user's custom-designed webpage. Because current systems are not equipped to show all of the icons awarded to the user, there are future economic benefits for the currently created method for the awards profile. Additionally, as different users aggregate different rewards or awards, the user profiles become more diverse across the aggregate demographics of the users, thereby making each user's profile unique from other users' profiles.

The user's awards profile may then be loaded onto social media websites including Facebook and Twitter, increasing the likelihood that others will view and access the website from which the profile originated.

Other systems, devices, methods, features, and advantages will be or become apparent to one with skill in the art upon examination of the following drawings and detailed description. It is intended that all such additional systems, methods, features, and advantages included within this description be within the scope of the present disclosure, and be protected by the accompanying claims.

What is claimed is:

1. A method of creating an awards profile comprising:
creating an empty image having a fixed two dimensional space;
executing logical encodings, each of the logical encodings having a predefined set of conditions for changing a logical encoding state from an off state to an on state, wherein the predefined set of conditions are assessed in reference to a received user action;
allocating coordinates corresponding to each of the logical encodings to locations within the fixed two dimensional space;
executing graphical encodings that each provide a visual identifier of the predefined set of conditions of the on state of an associated one of the logical encodings;
overlaying the graphical encodings onto the fixed two dimensional space at the coordinates corresponding to the associated logical encodings;
ordering badges into an entry queue, wherein the badges are each associated with one of the logical encodings that have changed from the off state to the on state, and wherein each of the badges comprise a time stamp corresponding with a time that the associated one of the logical encoding changed from the off state to the on state;
selecting a first badge from the badges in the entry queue based on the time stamp; and
changing a graphical encoding state, of the graphical encoding associated with the logical encoding of the first badge, from an off state to an on state defining a display of the first badge at a first location on the fixed two dimensional space based on the coordinates corresponding to the associated logical encoding.

2. The method of claim 1, further comprising:
determining there is an additional badge in the entry queue;
selecting, in response to determining that there is the additional badge, the additional badge based on the time stamp;
changing the graphical encoding state, of the graphical encoding associated with the associated logical encoding of the additional badge, from the off state to the on state defining the display of the additional badge at the first location on the fixed two dimensional space based on the coordinates corresponding to the associated logical encoding; and
assigning the first badge to a second location on the fixed two dimensional space based on the coordinates corresponding to the associated logical encoding.

3. A method of creating an awards profile comprising:
creating an empty image having a fixed two dimensional space;
executing logical encodings, each of the logical encodings having a predefined set of conditions for changing a logical encoding state from an off state to an on state, wherein the predefined set of conditions are assessed in reference to a received user action;
allocating coordinates corresponding to each of the logical encodings to locations within the fixed two dimensional space;

executing graphical encodings that each provide a visual identifier of the predefined set of conditions of the on state of an associated one of the logical encodings;

overlaying the graphical encodings onto the fixed two dimensional space at the coordinates corresponding to the associated logical encodings;

ordering badges into an entry queue, wherein the badges are each associated with one of the logical encodings that have changed from the off state to the on state, and wherein each of the badges comprise a time stamp corresponding with a time that the associated one of the logical encoding changed from the off state to the on state;

selecting a first badge from the badges in the entry queue based on the time stamp;

changing a graphical encoding state, of the graphical encoding associated with the logical encoding of the first badge, from an off state to an on state defining a display of the first badge at a designated location on the fixed two dimensional space based on the coordinates corresponding to the associated logical encoding;

selecting a second badge from badges in the entry queue based on the time stamp; and changing the graphical encoding state, of the graphical encoding associated with the logical encoding of the second badge, from the off state to the on state defining the display of the second badge at the designated location on the fixed two dimensional space based on the coordinates corresponding to the associated logical encoding, wherein the second badge is stacked with the first badge in reverse chronological order, based on the time stamp of the first badge and the time stamp of the second badge, at the designated location.

4. A method of assigning a badge to an image comprising:

identifying the image as a fixed two dimensional space;

determining a received input is associated with one of a plurality of badges, wherein each of the plurality of badges is associated with a logical encoding, wherein the logical encoding comprises:
- information related to whether the badge is a locked badge or an unlocked badge,
- information related to one or more of whether the badge is a progress badge and a progress status, and
- a predefined set of conditions for changing a logical encoding state from an off state to an on state, wherein coordinates corresponding to the logical encoding are assigned to a location within the fixed two dimensional space, and wherein the predefined set of conditions are assessed in reference to the received input;

determining, in response to determining that the received input is associated with one of the plurality of badges, the badge is the unlocked badge based on the logical encoding associated with the badge;

determining, in response to determining that the badge is the unlocked badge, the badge is the progress badge based on the logical encoding associated with the badge;

determining, in response to determining that the badge is the progress badge, whether the badge has been completed based on the predefined set of conditions of the logical encoding associated with the badge;

activating the badge by changing the logical encoding state from the off state to the on state and time stamping the badge in response to determining that the badge has been completed;

changing a graphical encoding state, of a graphical encoding associated with the logical encoding of the badge, from an off state to an on state defining a display of the badge at the location on the fixed two dimensional space based on the coordinates corresponding to the logical encoding and in response to the activation and time stamping of the badge; and storing the badge in response to determining that the badge has not been completed.

5. Computer readable storage hardware with a program stored thereon, wherein the program instructs a processor to perform:

determining whether a received input is associated with one of a plurality of badges, wherein each of the plurality of badges is associated with a logical encoding, wherein the logical encoding comprises:
- information related to whether the badge is a locked badge or an unlocked badge,
- information related to one or more of whether the badge is a progress badge and a progress status, and
- a predefined set of conditions for changing a logical encoding state from an off state to an on state, wherein coordinates corresponding to the logical encoding are assigned to a location within a fixed two dimensional space, and wherein the predefined set of conditions are assessed in reference to the received input;

determining, in response to determining that the received input is associated with one of the plurality of badges, whether the badge is the unlocked badge based on the logical encoding associated with the badge;

determining, in response to determining that the badge is the unlocked badge, whether the badge is the progress badge based on the logical encoding associated with the badge;

determining, in response to determining that the badge is the progress badge, whether the badge has been completed based on the predefined set of conditions of the logical encoding associated with the badge;

activating the badge by changing the logical encoding state from the off state to the on state and time stamping the badge in response to determining that the badge has been completed;

changing a graphical encoding state, of a graphical encoding associated with the logical encoding of the badge, from an off state to an on state defining a display of the badge at the location on the fixed two dimensional space based on the coordinates corresponding to the logical encoding and in response to the activation and time stamping of the badge; and storing the badge in response to determining that the badge has not been completed.

* * * * *